UNITED STATES PATENT OFFICE.

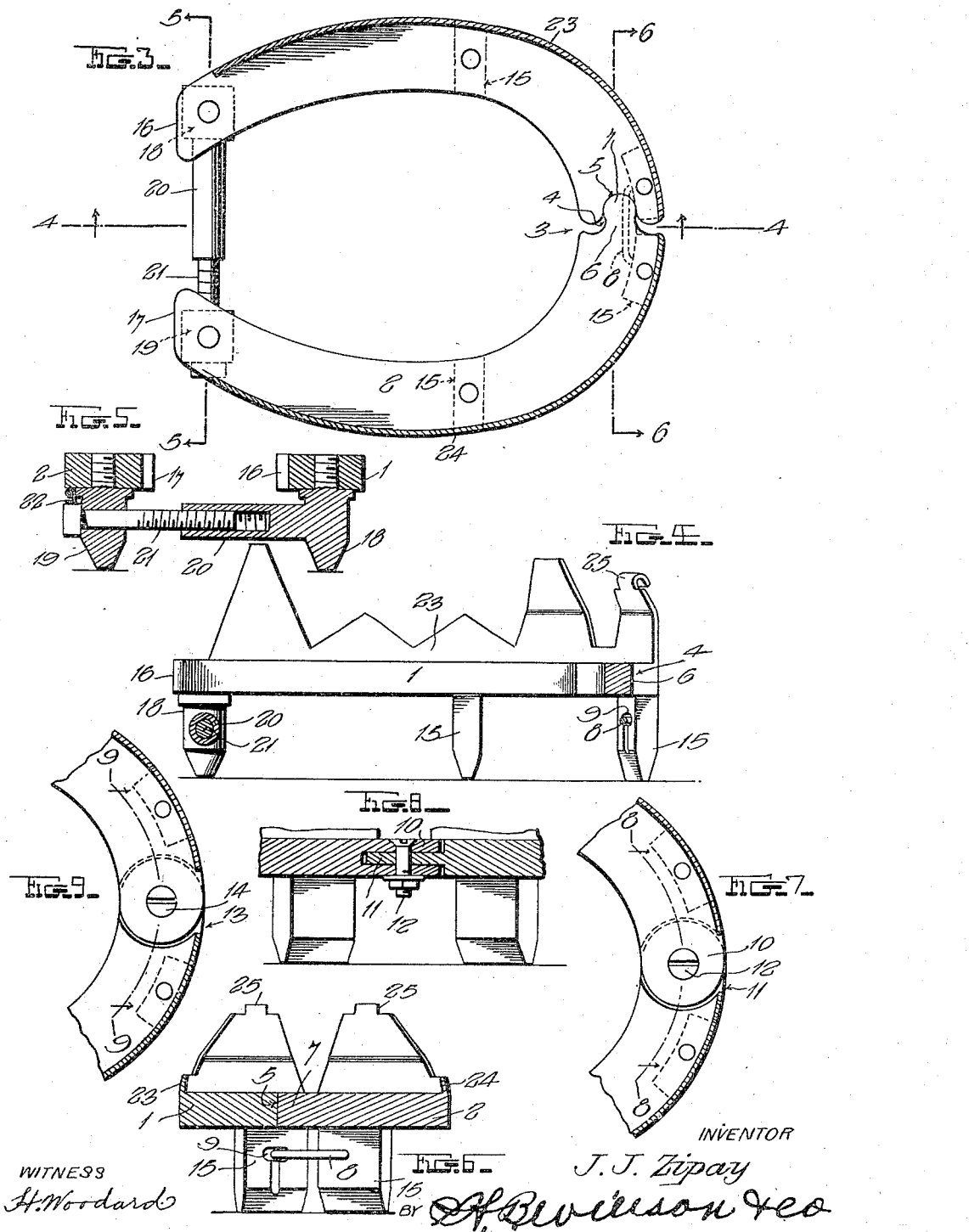

JOHN JOSEP ZIPAY, OF SANDCOULEE, MONTANA.

HORSESHOE.

1,206,640.

Specification of Letters Patent.   Patented Nov. 28, 1916.

Application filed June 26, 1916.   Serial No. 105,900.

*To all whom it may concern:*

Be it known that I, JOHN J. ZIPAY, a citizen of the United States, residing at Sandcoulee, in the county of Cascade and State of Montana, have invented certain new and useful Improvements in Horseshoes; and I do declare the following to be a full, clear, and exact description of the invention, such as will enable others skilled in the art to which it appertains to make and use the same.

This invention relates to new and useful improvements in horse shoes, and the primary object of the invention is to provide a shoe of this class which may be attached to the hoof of a horse without the use of nails.

Another object of this invention is to provide a device of this character which may be easily and quickly placed on or removed from the animal's hoof when desired.

Still another object of the invention is to provide a horse shoe that may be adapted to be used as the ordinary type of shoe or one which may be used as an overshoe, and placed over the conventional type of the shoe already applied to the hoof.

Another object of the invention is to provide a device of this character which is easily and simply constructed, inexpensive to manufacture, and one which will be very efficient in operation.

With these and numerous other objects in view my invention resides in the novel features of construction, combination and arrangement of parts which will be herein referred to and more particularly pointed out in the specification and claims.

In the accompanying drawings: Figure 1 is a side elevation showing my horse shoe applied to a horse's hoof; Fig. 2 is a plan view of the horse shoe; Fig. 3 is a horizontal section taken on the line 3—3 of Fig. 1; Fig. 4 is a vertical section taken on the line 4—4 of Fig. 3; Fig. 5 is a transverse section taken on the line 5—5 of Fig. 3; Fig. 6 is a transverse section taken on the line 6—6 of Fig. 3; Figs. 7 and 8 are detail views partly in section showing one form of hinge used to connect the two sections of the shoe; Figs. 9 and 10 are detail views partly in sections illustrating another type of hinge used to connect these sections; and Fig. 11 is a section taken on the line 11—11 of Fig. 1.

In describing my invention, I shall refer to the drawings in which similar reference characters designate corresponding parts throughout the several views.

The horse shoe proper comprises two sections designated by the numerals 1 and 2, which have their front ends hinged as shown at 3. The type of hinge used to connect these sections together is optional, various types being shown in the accompanying drawings. In Figs. 1, 2, 3 and 4, I have illustrated one form of hinge connecting the two sections, which consists in making one of the sections with a recess 4 in its end having an enlarged portion 5, which is adapted to receive a projection 6 from the opposite end of the other section, and the said projection being provided with an enlarged head 7 positioned in the enlarged portion 5. There is sufficient play between these parts when they are in position, to enable the two sections to swing a limited distance, which however will be sufficient for the purposes of the same. This type of hinge connection is also provided with a lock 8 which is secured to the inner surface of a calk on one end of one section, and which has its opposite end bent and adapted to be positioned in a recess 9 in a calk on the opposite section. In Figs. 7, 8, 9 and 10 I have illustrated two different types of hinges which may be used to connect these sections, the type shown in Figs. 7 and 8 having one end of one of the sections bifurcated as shown at 10 and the other end reduced as shown at 11, these end portions having an alining aperture therethrough adapted to receive a pivot pin 12. The other type shown in Figs. 9 and 10 of the drawing has the opposite adjacent ends of the sections reduced, with alining openings therethrough as shown at 13, and adapted to receive a pivot pin 14. By these two types of hinges, the sections will be allowed to swing, so that they may vary the width of the shoe.

The lower surface of the sections 1 and 2 of the shoe may be provided with a number of calks 15 thereon, the number and positioning of the same being optional to the manufacturer or user. If desired, however, these calks may be eliminated, the sections having their lower surface formed substantially similar to the conventional type of shoe.

Removably secured to the free ends 16 and 17 of the sections 1 and 2 is a pair of calks 18 and 19. The calk 18 has projecting laterally and inwardly therefrom an internally threaded socket member 20, which forms an arm thereon while projecting through the calk 19 that is secured to the end 17 of the shoe is a threaded bolt 21, which is adapted to have its threaded end operatively engage the said socket member. The other end of the bolt will be positioned outside of the calk 19, and the head of the bolt will be disposed against the outer side of the calk. By this means the distance between the calks may be varied, and consequently the width of the shoe correspondingly adjusted owing to the fact that any movements of the calks will be transmitted to the hinged sections.

The bolt 21 that controls the adjustment of the shoe is adapted to be locked against rotation by a hinged locking member 22 that is secured to the outer side of the calk 19, and which is adapted to swing down and be positioned against one face of the head of the bolt, whereby the bolt will be prevented from rotation. When it is desired to rotate the bolt to vary the adjustment of the width between the sections of the shoe, this locking member 22 is swung upwardly whereby the head of the bolt may move freely, and consequently the bolt can be rotated. Furthermore, the movable calks 18 and 19 owing to the fact that the calk 18 is provided with a laterally projecting arm, and the calk 19 with a bolt will be easily detachable, as the arm or bolt may be grasped and the projecting studs that are screwed into openings at the free ends of the horseshoe may be rotated to quickly detach the calks therefrom. These calks are provided with the usual type of upwardly projecting stud, which is commonly used to secure them to a shoe. The bolt and projecting arm form a double function, inasmuch as in addition to forming the adjusting means between the hinged sections, they also enable the calks to be easily grasped and rotated for attaching and detaching.

The sections 1 and 2 of the horse shoe are provided with upwardly and inwardly projecting flanges 23 and 24, which have serrated upper edges, and which are adapted when the shoe is in position to engage the lower outer surface of the horse's hoof. The front ends of the flanges are bent inwardly at their uppermost points to form hooks 25 for a purpose to be hereinafter more fully described. The rear ends of these flanges have secured thereto fastening members 26, which have hinged tongues 27 adapted to swing back upon themselves when in locked position as clearly shown in Figs. 1 and 2 of the drawing. These fastening members 26 are securely engaged by connecting links 28 with slots 29 in the inner sides of the rear projections of the flanges.

To securely hold the shoe in position, I have provided an arcuate slightly flexible metallic plate 30, which is adapted to be positioned across the upper front portion of the horse's hoof, and which conforms substantially to the shape of the same. This plate 30 is provided with converging opposite ends 31, which have therein spaced slots 32 extending from said ends. The plate 30 has its upper edge inwardly flared as shown at 33, so that the same will fit snugly against the hoof of the animal when in position thereon. On opposite sides of the center of the lower edge of the plate are slots 34, which are adapted to receive the hooks 25 on the adjacent ends of the flanges, when the shoe is in position.

When the plate 30 has been connected with the hooks 25 on the forward end of the flanges of the shoe, the tongues of the fastening members 26 are then adapted to be positioned through any of the slots 32 in the opposite ends of said plate, according to the size of the hoof upon which it is positioned. These tongues are positioned through the opening or slot, and then are moved to their locked position, whereby the plate will be securely held on the hoof. Owing to the fact that the ends of the plate 30 are provided with a plurality of spaced openings, the fastening members on the flanges may be engaged with any of these openings, so that the parts may be securely held in engagement with the various sizes of hoofs.

In placing this horse shoe in position on the horse's hoof, the two hinged sections are first placed beneath the same in the usual manner, and the flanges 23 and 24 will snugly engage the outer and lower surface of the hoof. This engagement is made secure by means of a longitudinally extensible connection between the free ends of the hinged sections. When thus engaged with the hoof, the top plate 30 is positioned across the upper front portion of the hoof, and its front lower edge is engaged with the flanges by the hooks 25 on the front ends of the same passing through the slots in said lower edge of the plate. This plate is tightened into engagement by means of the adjustable and quickly detachable fastening members 26 being engaged with the opposite ends of the plate in a manner hereinbefore fully described. If desired for light work, this top-supporting plate may be left off and the shoe will be sufficiently engaged with the hoof by means of the flanges of the same, and the longitudinally extensible connection at the free ends of the sections.

This shoe is designed primarily to do away with the necessity of the employment of the usual type of nails, such as are ordinarily used to secure the shoe in position, however, it will be obvious that the shoe is adapted for use as an overshoe, and may be positioned on the horse's hoof that is already provided with the conventional type of shoe. When the device is used as an overshoe, the use of calks is absolutely necessary, but when in ordinary use, the application of calks thereto is optional.

From the foregoing description, the construction and operation of my new improved horse shoe, the manner of applying the same to use and the operation thereof will be readily understood and it will be seen that I have provided simple and efficient means for carrying out the objects of this invention.

I claim:

1. A horse shoe of the class described comprising two hinged sections, longitudinally extensible connecting means between the free ends of said sections, upwardly and inwardly projecting flanges on said sections, an arcuate slightly flexible plate adapted to be positioned across the upper front portion of a horse's hoof and having its ends adjustably and detachably connected with the flanges adjacent their rear ends, and said plate detachably connected with the adjacent ends of said flanges at the front of the hoof.

2. A horse shoe of the class described comprising two hinged sections having calks thereon, longitudinally extensible connecting means between the free ends of said sections, upwardly and inwardly projecting serrated flanges on said sections, fastening members secured adjacent the rear ends of said flanges, hooks formed on the uppermost points at the front ends of the flanges, an arcuate slightly flexible plate with converging ends adapted to be positioned across the upper front portion of a horse's hoof, said ends of the plate having a plurality of spaced slots therein adapted to receive the fastening members, and the lower edge of said plate being slotted to receive the hooks on said flanges.

3. A horseshoe of the class described comprising two hinged sections having openings adjacent their free ends, calks with projecting studs adapted to be removably positioned in said openings, means to secure said sections to a horse's hoof, a laterally projecting integral socket member extending from one of said calks and forming an arm thereon, the other calk having an opening therethrough disposed in alinement with the said socket member, and a bolt projecting through said opening in the calk and having a threaded engagement with the socket member of the opposite calk.

In testimony whereof I have hereunto set my hand in the presence of two subscribing witnesses.

JOHN JOSEP ZIPAY.

Witnesses:
GEORGE SABO, Jr.,
GEORGE SABO.

Copies of this patent may be obtained for five cents each, by addressing the "Commissioner of Patents, Washington, D. C."